Aug. 16, 1938.                R. A. RODRICK                2,127,142
                         WINDSHIELD WIPING DEVICE
                          Filed March 3, 1936
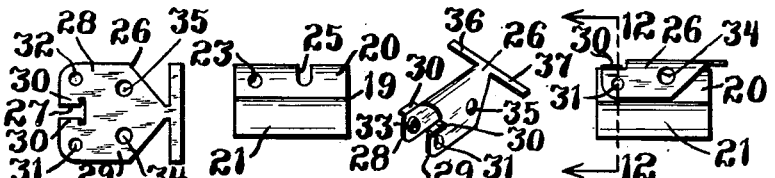
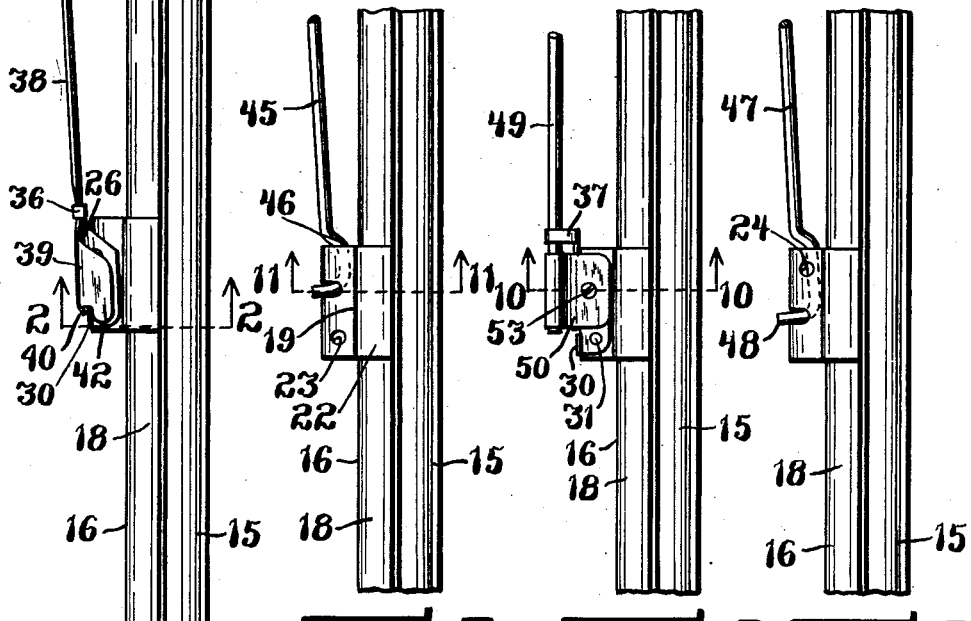
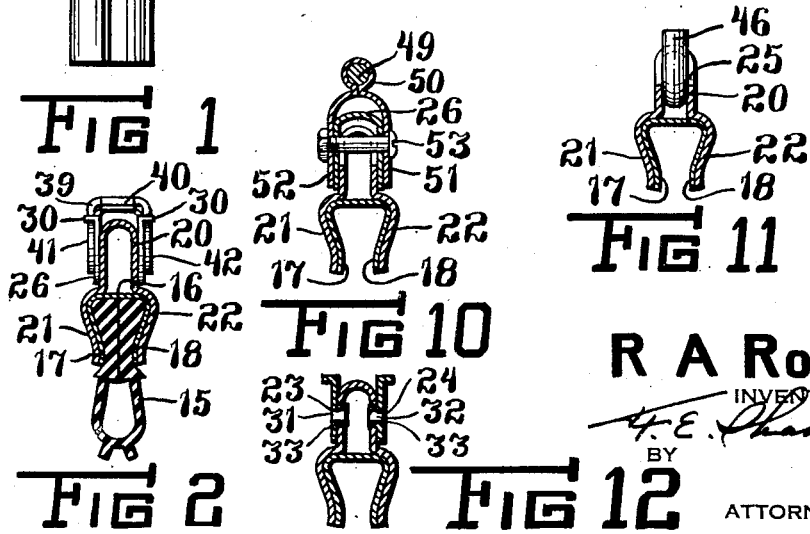
R A RODRICK
INVENTOR
BY
ATTORNEY Patented Aug. 16, 1938

2,127,142

UNITED STATES PATENT OFFICE 2,127,142

WINDSHIELD WIPING DEVICE

Raymond A. Rodrick, Akron, Ohio

Application March 3, 1936, Serial No. 66,815

7 Claims. (Cl. 15—250)

This invention relates to windshield wiping elements and has particular relation to improvements in means for detachably securing a wiper element to a wiper arm.

Objects of the invention are to provide a connecting element of simple, durable construction by which a wiper element may be quickly and conveniently attached to an arm and securely held thereon; to provide an improved clip which may be adjustably mounted on a wiper element to adapt it for use in connection with arms of different types whereby a wiping element of the character disclosed in my co-pending application, Serial Number 752,269 may be efficiently used with an arm of any conventional type and which will permit efficient operation of the wiping element with substantially no flopping action and to provide an attachment for a channeled arm whereby it may be operatively attached to blades of different types.

In the drawing there is illustrated an adaptation of the invention which accomplishes the objects above enumerated, it being understood that the invention is not confined to the particular embodiment illustrated and that changes and modifications may be made which come within the spirit of the invention as set forth in the claims hereunto appended.

In the drawing:

Figure 1 is a side elevational view of a wiping element having a channeled arm operatively secured thereto in accordance with this invention, only a portion of the arm being shown, Figure 2 is a cross sectional view taken as indicated by the lines 2—2 of Figure 1, Figure 3 is a plan view of a blank as it is cut preparatory to forming an attaching device constructed in accordance with this invention, Figure 4 is a side elevational view of an attaching clip constructed in accordance with this invention, Figure 5 is a perspective view of an adapter constructed in accordance with this invention, Figure 6 is a side elevational view showing the adapter operatively positioned on the clip shown in Figure 4, Figure 7 is a side elevation showing the central portion of a wiper arm with the improved clip shown in Figure 4 mounted thereon and showing the manner of attaching one form of wiper arm thereto, only a portion of the arm being shown, Figure 8 is a similar view showing the manner of attaching another type of wiper arm to a wiping element, Figure 9 is a similar view showing the central portion of a wiper blade and illustrating the manner of attaching another type of wiper arm thereto, Figure 10 is a cross sectional view taken as indicated by the lines 10—10 of Figure 8.

Figure 11 is a similar, sectional view taken as indicated by the lines 11—11 of Figure 7, Figure 12 is a cross sectional view taken as indicated by the lines 12—12 of Figure 6.

In the particular adaptation of the invention disclosed in the drawing, there is illustrated a wiping element 15 having a channeled back 16 extending throughout the length of the wiping element. The channeled back 16 has smooth, imperforate, inwardly converging side walls 17 and 18. A clip 19 for frictionally and resiliently gripping the channeled back 16, is provided, and comprises a pair of gripping jaws 21 and 22 shaped to conform to and resiliently grip the sides 17 and 18 of the back portion. The jaws terminate in inturned shoulders which engage the back of the channel 16, which shoulders are in turn connected to a U-shaped base portion 20, as best shown in Fig. 2. With the clip 19 mounted on the channel back 16, the U-shaped base portion 20 projects rearwardly therefrom. The side walls of the base portion 20 are provided adjacent one end thereof with laterally alined bores 23 and 24 through which a bolt, cotter-pin or other fastening means may be positioned to hingedly secure the clip 19 to an arm. The base portion 20 is also provided in the upper side thereof with a notch 25 which extends laterally thereacross and forms an opening leading to the interior of said base portion 20.

A saddle member is formed by first shaping a blank as shown in Fig. 3, which blank is provided with a T-shaped notch 27 formed in the edge 26, which notch provides oppositely disposed lugs 30. The blank is bent along its medial line (Fig. 5) to a U-shaped formation, thus providing parallel side walls 28 and 29 adapted to fit snugly over the base 20 of the clip 19. The lugs 30 adjacent the notch 27 are bent outwardly so that they project laterally from the side walls of the saddle for a purpose thereinafter to be described.

The side walls 28 and 29 are provided adjacent the forward end thereof with laterally alined bores 31 and 32. The walls 28 and 29 adjacent to the bores 31 and 32 are stamped inwardly to form axially alined, cylindrical lugs 33 which are adapted to be received in the openings 23 and 24 in the base portion 20. The saddle member 26 is provided adjacent the rear end thereof with laterally alined bores 34 and 35 which are formed therein so as to coincide with the notch 25 when the saddle member 26 is mounted on the clip 19. The saddle member 26 is provided at the rear end thereof with laterally projecting tabs 36 and 37 for a purpose presently to appear.

In Figure 1 there is shown an arm 38 having a channeled end 39. The web of the channeled end 39 is continued to form a forwardly and downwardly inclined projecting portion 40. The lateral sides 41 and 42 of the channeled end 39 project in parallel relation to each other beyond the ends of the channel.

In using an arm 38 with a channeled end portion 39, the saddle member 26 is pressed over the base 20 of the clip 19. As the saddle member 26 is formed of relatively thin, flexible material, the side walls 28 and 29 may be sprung apart to permit the cylindrical portions 33 being entered in the openings 23 and 24, thus hingedly securing the saddle member 26 to the clip 19. The channeled end 39 of the arm 38 is then placed over the saddle 26 with the lip 40 engaging the forward edge thereof and with the forwardly projecting portions 41 and 42 of the side walls positioned beneath the lugs 30. The tabs 36 and 37 are then folded around the shank of the arm 38 thus securely attaching the clip 19 to the arm 38.

It will be seen that the forwardly extending portions of the side walls 41 and 42 of the arm end 39 overlap the openings 31 and 32 of the saddle member 26, thus securely holding the cylindrical lugs 33 in the openings 23 and 24 of the clip 21.

In Figures 7 and 11 there is shown a wire arm 45 having a hooked end portion 46 which is entered in the U-shaped base 20 with the free end of the portion 46 projecting through the notch 25. In Figure 9 there is shown a similar arm 47 having a relatively longer hooked end portion 48 which is entered in the opposite end of the base 20 with the free end thereof projecting from the notch 25.

In Figure 8 and Figure 10 there is shown another conventional type of arm 49 which is provided with an attaching device 50 having spaced, parallel leaves 51 and 52 forming a channel adapted to receive the saddle member 26. A bolt, cotter pin or other attaching means 53 is entered through suitable laterally alined bores in the leaves 51 and 52 and through bores 34 and 35 and the notch 25. The tabs 36 and 37 are then folded around the shank 49 to securely hold the clip 19 in the proper position on the arm 49.

It will thus be seen that I have provided an attaching clip for securing a wiper element to any type of arm and which will securely hold the blade in an operative position on an arm and permit proper operation of the blade without flopping action.

Having thus illustrated my invention and described the same in detail, what I claim as new and desire to secure by Letters Patent is:

1. A wiper blade having a clip projecting from the back thereof, said clip provided with seats on each lateral side thereof, a channeled attaching member adapted to saddle said clip; lugs projecting inwardly from each side wall of said attaching member; said lugs adapted to snap into said seats to hingedly secure the attaching member to said clip and means to engage the channeled end portion of a wiper arm with the side walls of said channeled end portion of said wiper arm holding the walls of said attaching member against said clip to retain said lugs in said seats and means to secure said attaching member to the shank of such wiper arm.

2. In combination, a windshield wiper arm provided with a blade carrying portion U-shaped in cross section, the side walls of said portion arranged to project from said arm toward the windshield glass, a wiper blade having an arm attaching part provided with side walls arranged substantially parallel to said first named side walls and proportioned to fit therebetween, a connector element telescopically interposed between said arm portion and blade part so that the arm portion overlaps both said blade part and said element, means to secure said element to said portion and means to secure said element to said part to provide an operative mounting of said blade on said arm.

3. In combination, a windshield wiper arm provided with a blade carrying portion U-shaped in cross section, the side walls of said portion arranged to project from said arm toward the windshield glass, a wiper blade having an arm attaching part provided with side walls arranged substantially parallel to said first named side walls and proportioned to fit therebetween, a connector element telescopically interposed between said arm portion and blade part, bendable tabs provided at one end of said element to secure said end to the wiper arm and means spaced from said bendable tabs interlocking said element and the arm, a second means spaced from said bendable tabs and said first means cooperating with said blade carrying portion arranged to interlock said element, arm and said blade part to establish an operative wiping relation between said arm, blade and windshield glass.

4. A windshield wiper blade provided with a back portion adapted to project between the side walls of a U-shaped wiper arm, a connector element interposed between said back portion and said arm comprising a U-shaped clip having the side walls thereof telescopically received within said arm, said clip in turn arranged to telescopically receive said back portion, bendable tabs projecting from one end of said clip adapted to engage a portion of said wiper arm, means on said clip spaced from said tabs effecting a further securement of said clip to said arm and means projecting inwardly of the clip to interlock said clip to said blade back portion comprising inwardly extending protuberances held in an interlocking relation with said blade back portion by the side walls of said U-shaped wiper arm.

5. A windshield wiper blade comprising a back portion adapted to be arranged between depending wiper arm ears, alined recesses formed in said portion, a connector element having inwardly extending protuberances operatively associated with said recesses, means including tabs spaced from said protuberances carried by said element to secure the same to said arm, said element proportioned with respect to said wiper arm ears whereby said ears force and maintain said protuberances within said back portion recesses.

6. A windshield wiper blade comprising a back portion adapted to be arranged between depending wiper arm ears, opposed recesses formed in the side walls of said back portion, a connector element provided with inwardly extending protuberances arranged to co-operate with and be retained in said recesses, means including a removable fastener pin spaced from said protuberances effective to secure said connector element to said arm, said element being proportioned to fit snugly between said ears whereby said ears hold said element with its protuberances arranged within said back portion recesses.

7. A windshield wiper blade comprising a back portion adapted to be arranged between depending wiper arm ears, a pair of alined recesses formed in said back portion and a notch formed in said back portion spaced from said recesses, a connector element having inwardly extending protuberances fitting between said depending ears and maintained within said recesses by said depending ears, means spaced from said protuberances including a removable fastener pin arranged to extend through said wiper arm ears and said element in alinement with said notch to secure said wiper arm element and blade in an operative wiping position.

RAYMOND A. RODRICK.